(No Model.)

H. P. HUMPHREY.
CAM.

No. 329,904. Patented Nov. 10, 1885.

Witnesses
Kirkley Hyde.
Gertrude M. Day.

Inventor
Henry P. Humphrey,
By Albert M. Moore,
His Attorney.

UNITED STATES PATENT OFFICE.

HENRY P. HUMPHREY, OF LOWELL, MASSACHUSETTS, ASSIGNOR TO THE LOWELL OILER COMPANY, OF NASHUA, NEW HAMPSHIRE.

CAM.

SPECIFICATION forming part of Letters Patent No. 329,904, dated November 10, 1885.

Application filed April 8, 1885. Serial No. 161,610. (No model.)

*To all whom it may concern:*

Be it known that I, HENRY P. HUMPHREY, a citizen of the United States, residing at Lowell, in the county of Middlesex and Commonwealth of Massachusetts, have invented certain new and useful Improvements in Cams, of which the following is a specification.

My invention relates to cams; and it consists in means, substantially as herein described and claimed, whereby such cams may be readily attached to and detached from a shaft.

Figure 1:
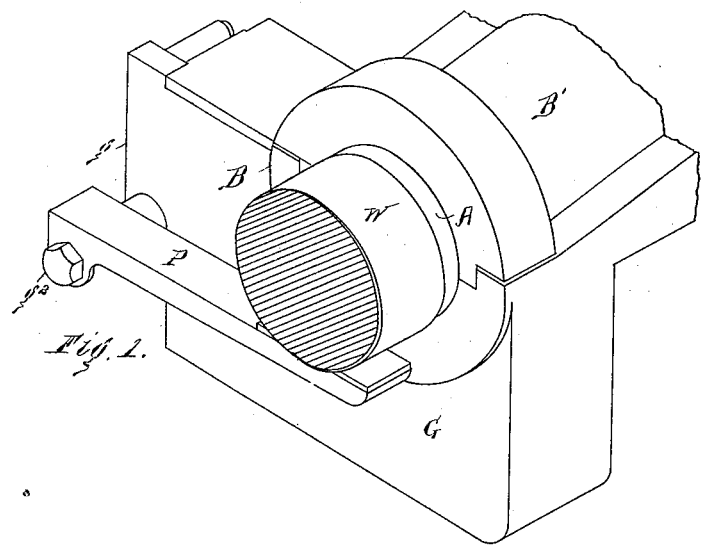
Figure 4:
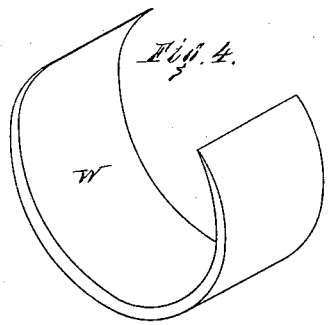
Figure 2:
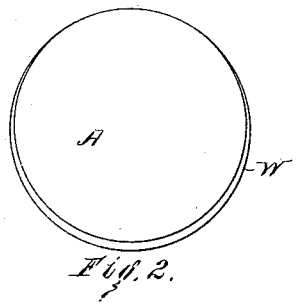
Figure 3:
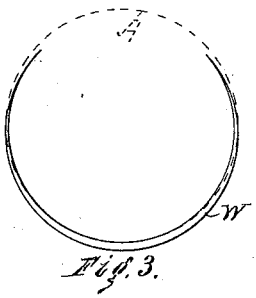

In the accompanying drawings, Figure 1 is an isometric view of a shaft, a journal-box provided with an oil-reservoir, a lever pivoted by a horizontal stud on the side of said reservoir, and a cam sprung upon the shaft; Fig. 2, an end view of a shaft with such a cam secured thereto; Fig. 3, a side elevation of the cam detached and contracted, the dotted lines indicating the circumference of a shaft; Fig. 4, an isometric view of the cam detached.

The cam hereinafter described may be attached to any cylindrical shaft, and may be used in a variety of machines, but is shown in Fig. 1 in combination with certain parts of a mechanical oiler and journal-box, substantially such as is described in an application for Letters Patent for improvement in mechanical oilers and journal-boxes for shafting filed by me January 12, 1885.

In said Fig. 1, A is a horizontal shaft. B is the journal-box proper, and B' is its cover; G, an oil-reservoir formed in one piece with the box B; P, the lever by which the pump (not shown) is operated, said lever P being pivoted on a horizontal stud, $g^2$, secured to a projection, $g$, on the back of said reservoir G, all substantially as described in the above-named application.

The cam W operates the lever P just as described in said previous application; but instead of being secured to the shaft A by wires, which surround the cam and the shaft and have their ends twisted together, is held on the shaft by its own elasticity.

The cam W is long enough to reach more than half-way around the shaft, and is scarfed down to an edge at each end, and, being made of steel, is shaped to have an internal curvature of smaller radius than the shaft to which it is to be secured, and is then given a spring temper.

The cam is applied to the shaft by forcing the opening between the ends of the cam against the side of the shaft until the ends spring apart far enough to admit the shaft. By crowding the cam still farther on the shaft its inner ends spring toward each other, and the inner surface of the cam is thereby drawn in close contact with the outer surface of the shaft, and, by its own elasticity, the cam is held securely on the shaft without other fastening.

The cam may be formed of any metal or material to which a spring temper can be given by fire or by rolling. The cam may be readily drawn from the shaft, if desired, by springing open its ends.

The cam above described may be used wherever a perfect immobility of the cam upon its shaft is not absolutely required.

I claim as my invention—

A cam formed of elastic material and having a curved inner surface the curvature of which is of a less radius than that of the outer surface of the shaft to which said cam is to be secured, and which inner surface of said cam is longer than half the circumference of said shaft, whereby said cam may be sprung upon said shaft and retained thereon by its own elasticity, substantially as specified.

HENRY P. HUMPHREY.

Witnesses:
ALBERT M. MOORE,
GERTRUDE M. DAY.